(12) United States Patent
Lewis

(10) Patent No.: US 8,331,981 B2
(45) Date of Patent: Dec. 11, 2012

(54) MOBILE DEVICE FOR ENHANCED CONNECTIVITY

(76) Inventor: Daren Lewis, San Diego, CA (US)

( * ) Notice: Subject to any disclaimer, the term of this patent is extended or adjusted under 35 U.S.C. 154(b) by 362 days.

(21) Appl. No.: 12/714,478

(22) Filed: Feb. 27, 2010

(65) Prior Publication Data

US 2011/0212749 A1    Sep. 1, 2011

(51) Int. Cl.
*H04M 1/00*    (2006.01)

(52) U.S. Cl. .......... 455/556.1; 455/90.2; 455/411; 455/413; 455/566; 710/100; 710/30; 710/67; 710/410; 710/310

(58) Field of Classification Search .......... 455/90.2, 455/556.1, 557, 411, 413, 550.1, 575.1, 66.1, 455/412.1, 466; 379/88.26, 88.13, 230, 207, 379/201, 397, 212, 401
See application file for complete search history.

(56) References Cited

U.S. PATENT DOCUMENTS

| | | | |
|---|---|---|---|
| 5,799,067 A * | 8/1998 | Kikinis et al. | 379/93.06 |
| 6,032,039 A * | 2/2000 | Kaplan | 455/413 |
| 6,058,303 A * | 5/2000 | .ANG.strom et al. | 455/413 |
| 6,763,226 B1 * | 7/2004 | McZeal, Jr. | 455/90.2 |
| 7,239,881 B2 | 7/2007 | Lekutai | |
| 7,502,622 B1 | 3/2009 | Lekutai | |
| 7,724,743 B2 | 5/2010 | Razdan et al. | |
| 7,765,266 B2 * | 7/2010 | Kropivny | 709/206 |
| 2002/0072395 A1 * | 6/2002 | Miramontes | 455/566 |
| 2006/0003779 A1 | 1/2006 | Lekutai | |
| 2006/0182152 A1 | 8/2006 | Bi et al. | |
| 2006/0221968 A1 | 10/2006 | Razdan et al. | |
| 2008/0287100 A1 * | 11/2008 | Satheesh et al. | 455/411 |
| 2009/0083060 A1 | 3/2009 | Sherman et al. | |
| 2009/0191893 A1 | 7/2009 | Smith | |
| 2009/0197641 A1 * | 8/2009 | Rofougaran et al. | 455/556.1 |
| 2009/0299805 A1 | 12/2009 | Baughman et al. | |
| 2010/0034130 A1 | 2/2010 | So et al. | |
| 2010/0035650 A1 | 2/2010 | Gottehrer | |
| 2010/0046410 A1 | 2/2010 | So et al. | |
| 2010/0135495 A1 | 6/2010 | Chion et al. | |
| 2010/0216396 A1 | 8/2010 | Fernandez | |
| 2010/0281258 A1 | 11/2010 | Andress et al. | |

* cited by examiner

*Primary Examiner* — Matthew Anderson
*Assistant Examiner* — Ganiyu A Hanidu

(57) ABSTRACT

A mobile device includes an air chip card for wireless connectivity to the internet or another mobile device, the air chip card being removably connected to the mobile device. A plurality of calling numbers are associated with the mobile device where an active call can be switched from one number to another. Means captures images for engaging in a video chat. A chat window displays the video chat. An optical port ports information to and from the mobile device where the optical port further enables scanning of objects. Means displays a flash in message. Means attaches a webpage to the mobile device for changing functions of the mobile device. Means solar charges the mobile device.

17 Claims, 2 Drawing Sheets

MOBILE DEVICE FOR ENHANCED CONNECTIVITY

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to mobile devices. More particularly, the invention relates to a mobile device with enhanced connectivity.

BACKGROUND OF THE INVENTION

The present invention provides a mobile touchtone device that solves needs that are thus far unmet by current mobile devices. For example, without limitation, current mobile devices do offer the ability to connect anywhere in the world with the same telephone numbers that are used in the United States. Users of current mobile devices often must deal with many dropped phone calls and blind spots that cause the loss of connectivity. Also, current mobile devices do not enable users to connect in the same manner as a business phone that can have more than one telephone line/number at a time. Furthermore, there is a need to solve the problem of not having a device to connect to a lap top computer through the Internet and also provide phone connectivity.

In view of the foregoing, there is a need for improved techniques for providing a mobile device that offers enhanced connectivity and many features not available in current mobile devices.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
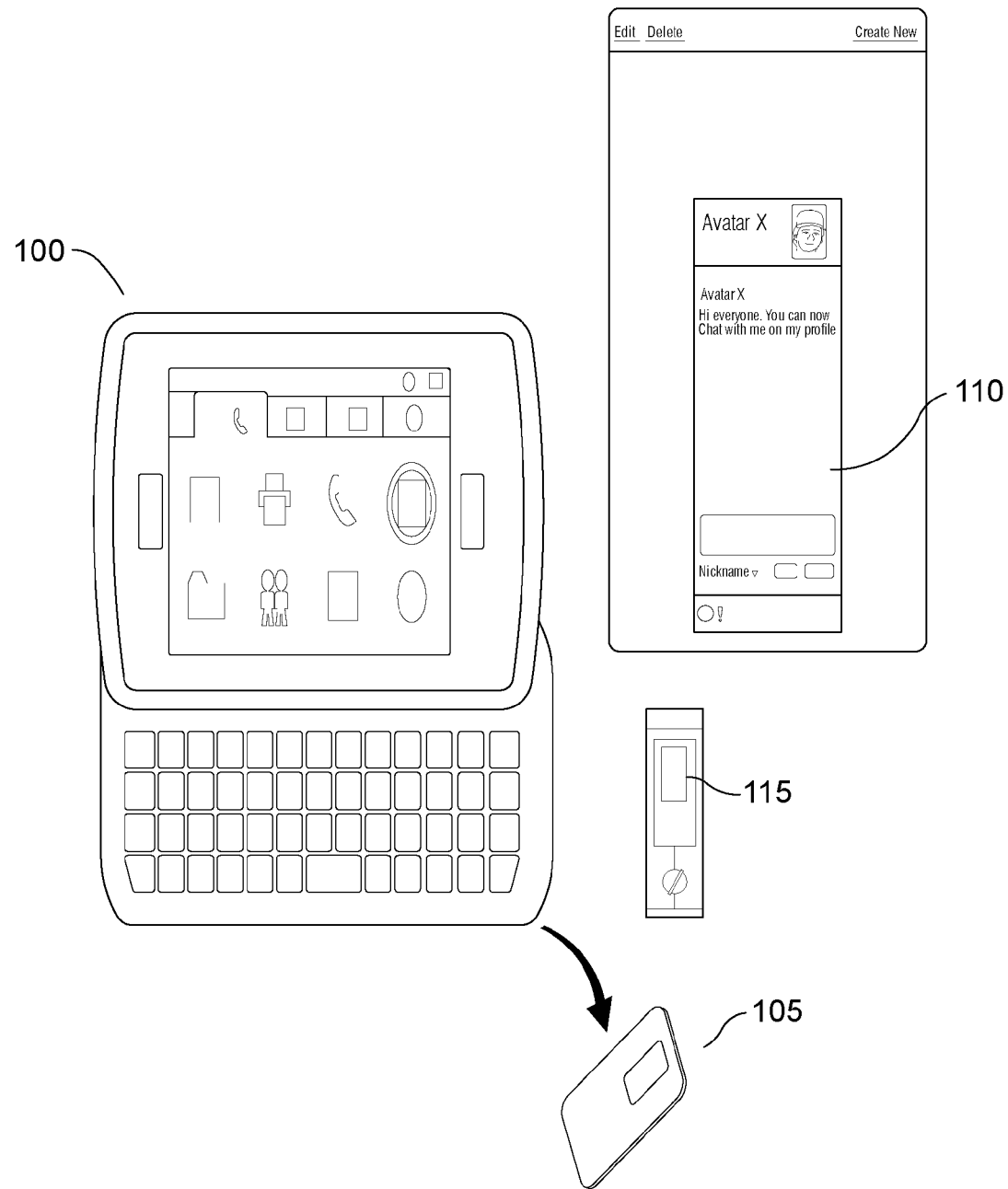
FIG. 1 illustrates an exemplary mobile device that uses a universal, slide in air card chip and can connect to the Internet, in accordance with an embodiment of the present invention. Also the back of the cell phone have an open solar screen that helps in keeping the phone charge majority of times.

FIG. 1 illustrates an exemplary mobile device 100 that uses a universal, slide in air card chip 105 and can connect to the Internet, in accordance with an embodiment of the present invention. In the present embodiment, mobile device 100 is a handheld cell phone. Mobile device 100 comprises a slot that is integrated into its side that enables air card 105 to slide into mobile device 100 for connectivity. It also has two built in antennas that will give a strong connectability for the mobile device. The use of air card chip 105 may be able to reduce the price of phone time by up to half. Users may connect air card 105 inside mobile device 100 to another cell phone, a laptop, a desktop computer, and television for cablevision etc. Air card chip 105 comprises connect devices that have a plug that can be placed onto the aircard chip that will allow it to be connected to a laptop or desktop computer, which can be removed at anytime to slide in and connect the cell phone. Mobile device 100 includes special application software graphical user interfaces for features such as, but not limited to, live chatting, reply to text format, video conference calling, flashing in banner cartoon messages stating that you love some one, also flash in different advertisement for upcoming sales by many different companies, you can also have a stores add themselves as a favorite to your phone so that you can receive future or daily sales, politic updates, upcoming events. etc. The software also enables users to have the same advantages as any other cell phone such as, but not limited to, instant messages, being able to reply to live video conferencing, Yahoo messenger by live video, Google chats, Skpe video, etc.

In the present embodiment, users have the ability to connect to the Internet through their cell number anywhere in the world and are able to keep the same telephone number. Mobile device 100 may be assigned more than one telephone number at any given time so mobile device 100 may act as a business phone with multiple telephone lines. This enables a user to switch an active call seamlessly from one number to another for example, without limitation, from a cell phone number to a home phone number (and vice versa). Users of mobile device 100 also may change the telephone number assigned to device 100 within minutes without assistance from someone else by going on a website to make changes. Users may also silence any one telephone number from ringing on mobile device 100 at any given time by putting a code so that by chance if anyone picks up picks your cell phone they are not able to see the other telephone numbers or call history of those numbers, while other numbers are still actively ringing and also viewed, and may set any number associated with mobile device 100 to ring at any other place such as, but not limited to, a home phone or another mobile device.

In the present embodiment, mobile device 100 comprises a live video messaging feature that enables users to chat live with another person while viewing that person on mobile device 100 in a chat window 110 that is displayed on the screen of mobile device 100. A user may use this feature for example, without limitation, to view his boss during conference calls. This feature may also enable the user to watch movies on his phone. Mobile device 100 comprises two cameras, one on the front and one on the back. This universal design enables the user to have conference calls on mobile device 100. The user can view the people live on the other end of the call while sending them messages or down loading a video to a website, webpage, or personal e-mail for example, without limitation, text messages, voice messages, or conventional talking. There can be as many members as the user likes on a conference call. Users also have the ability to set up a private chat room page account with a special friend or friends. In order to invite friends to the account, they are given a code to enter the chat room. The creator of the chat room has the ability change this code at anytime to block or delete someone from viewing capabilities. In the present embodiment, users can have up to five accounts and pages of various topics for example, without limitation, from teaching to just talking with friends and sharing information. These accounts have live video chat capabilities. The present embodiment also has the ability to send video via e-mail.

In the present embodiment, mobile device 100 utilizes and transfers features such as, but not limited to, voice recognition, SMS text feedback, one-touch voicemail dial back, and SMS message alerts. Mobile device 100 also enables a user to send e-mails to a home phone or another cell phone anywhere. Calendars and appointments may also be set up in mobile device 100. Additional features that may be available on mobile device 100 include, without limitation, GPS capabilities, a heart monitor that sends messages directly to your doctors e-mail, medication monitor alert of updates on your status, a world clock, weather forecasts, incoming breaking new. etc. The user of mobile device 100 also has the opportunity to design a customized background for mobile device 100. Mobile device 100 also comprises an infrared red port that provides beaming capabilities that enable a user to beam programs to and from any other computer or cell phone. Through the infrared port, mobile device 100 may perform many actions such as, but not limited to, flashing in messages, business cards and programs, downloading movies, scanning barcodes for price check capabilities, etc. A flash in message 115 pops up on the screen of mobile device 100 when received. Different flash in messages may include, without limitation, "I Love You" messages, greeting cards, cartoon pictures, music videos, news updates, business cards, etc. Price checks capabilities enable mobile device 100 to be used around the world on any product to check the price, compare against other stores, calculate sale prices, etc.

Another function of mobile device 100 is to give a user the ability to walk into any establishment such as, but not limited to, a bar, club or restaurant and place an instant message of dating desires or matches for that night are to attempt to match someone else by sending a pop up message. In this mobile device you will also be able to use these features in other countries as-well-as the United States while traveling. Another feature to this phone is you will be able to also send future messages to a traveling destination or zip code prior to arriving at that destination. You can also breakdown your search match by country, state, city, town, race, ethnicity, gender, class subject, specific high school, specific college, specific university, class subject, major, business profession, telephone number, address, distance and feet to close in the loop of your destination. These messages will be viewed and read by any language that you want it to be read in any other country. You also have the option to be able to block off certain groups by age, and the option to group specific people in sections to be viewed by whomever group you set up to be viewed by. This option will be the attach webpage to your cell phone in order to make these changes to your cell. This is an added function in the software of mobile device 100 that also enables the user to send someone a message with a picture, be able to roll through multiple profiles so that they can except or deny the user's profile by flashing the user a message. In this message the user is able to chat live if he likes.

In typical use of the present embodiment, mobile device 100 gives a user the opportunity to connect air card chip 105 with mobile device 100 as well as with a computer. Also, mobile device 100 may cut down on the amount of minutes used while still giving the user the opportunity keep the features that other cell phones on the market offer and more. Other features that are supported by mobile device 100 include, without limitation, flash in business cards, three way calling like a home phone, flash in "I love you" messages, more than one telephone number assigned to mobile device 100 at one given time, the ability to shut off a telephone number while other telephones numbers are still active. Mobile device also has many other features, such as, but not limited to, the ability to view and engage in live chats with other people on the other side of mobile device 100, the ability to scan store number codes for items and calculate price checks in the store while viewing other price reductions in other stores, the ability to receive feedback on text messages sent, e-mail capabilities, calendar and appointment capabilities, GPS capabilities, weather forecasts, the ability to receive flash in alerts while talking, flash in (IM) alerts notifying capabilities, conference call viewing capabilities, the ability to watch movies, different ring tone set ups, the changing of font and background colors etc.

Those skilled in the art, in light of the present teachings, will readily recognize that alternate embodiments of the present invention may be implemented with various different or additional features such as, but not limited to, basic calling features, call history, auto attendant features, Find Me/Follow Me features, IP and hard fax support, voicemail to email integration, remote office management, Outlook integration, automatic call distribution (ACD) and call center support, queuing and departments, E911 services, mobile call management, professional recording and customizations, dedicated setup specialists, basic customization FREE, calendars and time zones, receipt of text, receive receipt for e-mail, spell check, all messages receive receipt, downloading movies, downloading music, multiple (IM) video cameras, ring tones, incoming call on next telephone number, receipt of message from last telephone number, listing of current and last incoming calls, call waiting, three way calling, etc.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 2:
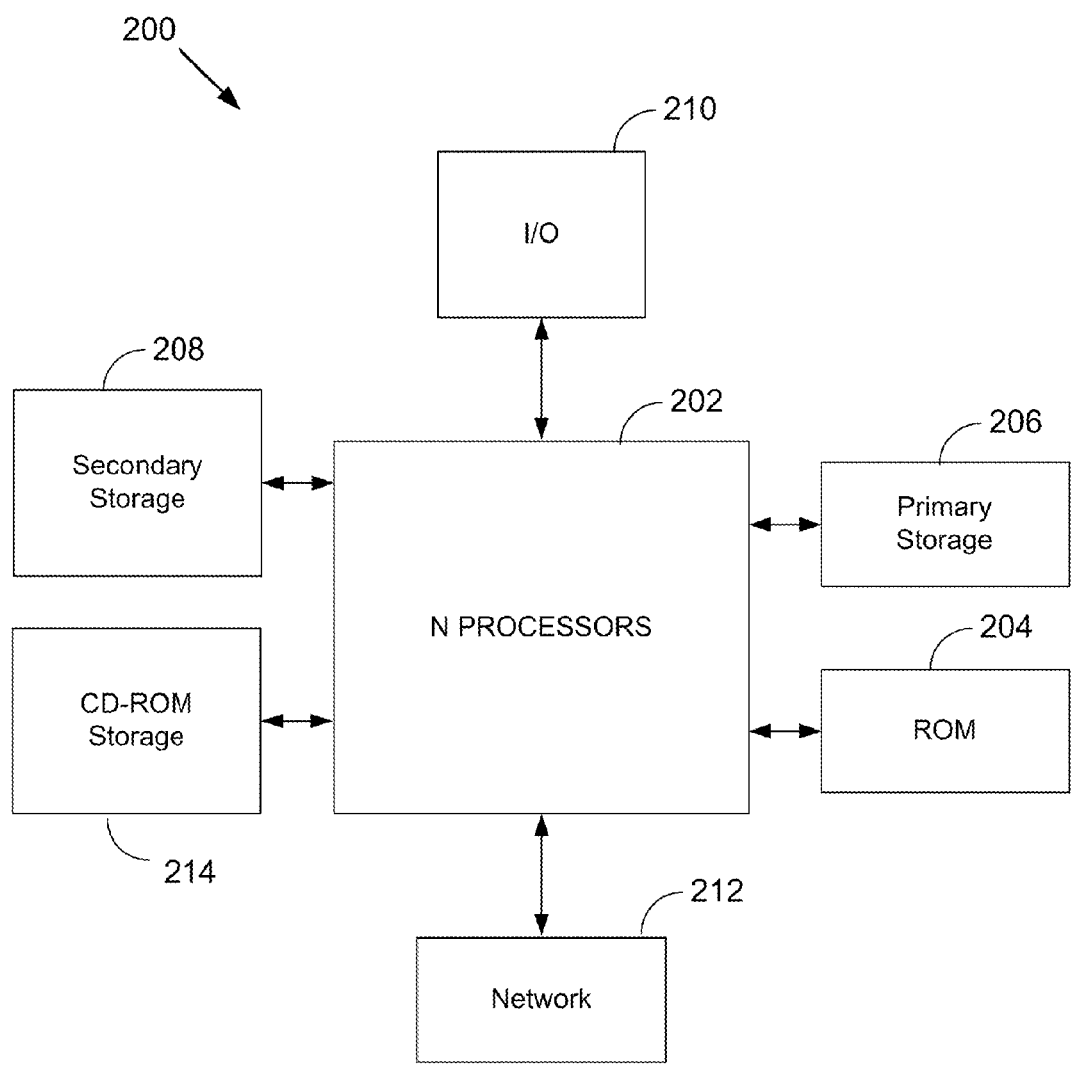
FIG. 2 illustrates a typical computer system that, when appropriately configured or designed, can serve as a computer system in which the invention may be embodied.

FIG. 2 illustrates a typical computer system that, when appropriately configured or designed, can serve as a computer system in which the invention may be embodied. The computer system 200 includes any number of processors 202 (also referred to as central processing units, or CPUs) that are coupled to storage devices including primary storage 206 (typically a random access memory, or RAM), primary storage 204 (typically a read only memory, or ROM). CPU 202 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 204 acts to transfer data and instructions uni-directionally to the CPU and primary storage 206 is used typically to transfer data and instructions in a bi-directional manner. Both of these primary storage devices may include any suitable computer-readable media such as those described above. A mass storage device 208 may also be coupled bi-directionally to CPU 202 and provides additional data storage capacity and may include any of the computer-readable media described above. Mass storage device 208 may be used to store programs, data and the like and is typically a secondary storage medium such as a hard disk. It will be appreciated that the information retained within the mass storage device 208, may, in appropriate cases, be incorporated in standard fashion as part of primary storage 206 as virtual memory. A specific mass storage device such as a CD-ROM 214 may also pass data uni-directionally to the CPU.

CPU 202 may also be coupled to an interface 210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to an external device such as a database or a computer or telecommunications or internet network using an external connection as shown generally at 212, which may be implemented as a hardwired or wireless communications link using suitable conventional technologies. With such a connection, it is contemplated that the CPU might receive information from the network, or might output information to the network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA.

Having fully described at least one embodiment of the present invention, other equivalent or alternative methods of providing a mobile device with enhanced connectivity and features according to the present invention will be apparent to those skilled in the art. The invention has been described above by way of illustration, and the specific embodiments disclosed are not intended to limit the invention to the particular forms disclosed. For example, without limitation, embodiments described in the foregoing were directed to cell phone implementations; however, similar techniques are to provide enhanced connectivity and features in other types of wireless mobile devices such as, but not limited to, PDAs, netbooks, smartbooks, personal navigation systems, handheld game consoles, etc. Non-cell phone implementations of the present invention are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A non-transitory, program storage device readable by a machine tangibly embodying computer codes executable by the machine, said storage device comprising:

computer code for wireless connecting to the internet and a separate mobile device, and for wired connecting to a laptop, a desktop computer, and a television;

computer code for switching an active call from one number to another;

computer code for engaging in a video chat;

computer code for displaying the video chat;

computer code for porting information;

computer code for displaying a flash in message comprising a cartoon message;

computer code for changing functions of the mobile device via a webpage, said functions including scheduling to send messages to other mobile devices at a destination using said porting computer code, said scheduling being prior to arriving at that the destination;

computer code for receiving faxes and providing capabilities of viewing and optionally signing a name to a received fax, said computer code being further operable to enable taking a picture of a document, uploading said document picture for signature and forwarding said potentially signed document picture as a fax copy, said computer code being further operable to forward faxes to other telephones numbers, electronic devices, telephone fax machines; and computer code for enabling price checking by scanning a product code in a store and comparing price against another store's prices and enabling the reservation of products in said other stores.

2. The device as recited in claim 1, further comprising computer code for enabling GPS driven direction to a product corresponding to said product code, and to generate corresponding price(s) for at least one other retail outlet within a certain distance from a users GPS location.

3. A mobile device comprising:
an air chip card for wireless connectivity to the internet or/and another mobile device, the air chip card being further configured for wired connectivity to a laptop, a desktop computer, and a television, the air chip card being removably connected to the mobile device;
a plurality of calling numbers associated with the mobile device wherein an active call can be switched from one number to another;
a non-transitory program storage device readable by a machine tangibly embodying program of instructions executable by the machine, said storage device comprising:
computer code for capturing images for engaging in a video chat;
computer code for generating a chat window for displaying the video chat;
computer code for displaying a flash in message comprising a cartoon message;
computer code for attaching a webpage to a mobile device for changing functions of the mobile device, said functions including scheduling to send messages to separate mobile devices at a destination using an optical port, said scheduling being prior to arriving at the destination; and,
computer code for receiving faxes and providing capabilities of viewing and optionally signing a name to a received fax;
said computer code being further operable to enable taking a picture of a document uploading, uploading said document picture for signature and forwarding said potentially signed document picture as a fax copy, said computer code being further operable to forward faxes to separate mobile devices with different telephone numbers, telephone fax machines;
computer code for enabling price checking by scanning a product code in a store and comparing prices against a separate store's prices and enabling a reservation of product in separate other stores; and
wherein said optical port for porting information to and from the mobile device where the optical port further enables scanning of objects.

4. The storage device as recited in claim 3, further comprising computer code for enabling GPS driven direction to a product corresponding to said product code, and to generate corresponding price(s) for at least one other retail outlet within a certain distance from a users GPS location.

5. The mobile device as recited in claim 3, wherein said objects include barcodes for price checks.

6. The mobile device as recited in claim 3, wherein flash in messages include personal messages, greeting cards, cartoon pictures, music videos, news updates or business cards.

7. The mobile device as recited in claim 6, wherein a language of the flash in messages is selectable.

8. The mobile device as recited in claim 3, wherein the optical port enables transferring programs and movies.

9. The mobile device as recited in claim 3, wherein the optical port enables transferring a flash in message to a plurality of mobile devices within a location.

10. The mobile device as recited in claim 3, wherein one or more of the plurality of calling numbers are changeable via a website.

11. The mobile device as recited in claim 3, wherein one or more of the plurality of calling numbers can be shut off while other numbers remain active.

12. The mobile device as recited in claim 3, wherein one or more of the plurality of calling numbers can be silenced using a code where one or more of the plurality of calling numbers or call history of those numbers hidden while other numbers are still actively ringing.

13. The mobile device as recited in claim 3, wherein the mobile device is a handheld cell phone comprising a slot integrated into its side for enabling the air chip card to slide into the mobile device for connectivity.

14. A mobile device comprising:
an air chip card for wireless connectivity to the internet or a separate mobile device, the air chip card being further configured for wired connectivity, the air chip card being removably connected to the mobile device;
a slot for enabling the air chip card to slide into the mobile device for connectivity;
a plurality of calling numbers associated with the mobile device where an active call can be switched from one number to another, one or more of the plurality of calling numbers are changeable via a website, one or more of the plurality of calling numbers can be shut off while other numbers remain active, and one or more of the plurality of calling numbers can be silenced using a code where one or more of the plurality of calling numbers or call history of numbers hidden while other numbers are still actively ringing;
a non-transitory program storage device readable by a machine tangibly embodying program of instructions executable by the machine, said storage device comprising:
computer code for capturing images for engaging in a video chart;
computer code for generating a chat window for displaying the video chat;
computer code for displaying a flash in message comprising a cartoon message;
computer code for attaching a webpage to a mobile device for changing functions of the mobile device, said functions including scheduling to send messages to separate mobile devices at a destination using an optical port, said scheduling being prior to arriving at the destination; and,
computer code for receiving faxes and providing capabilities of viewing and optionally signing a name to a received fax;
said computer code being further operable to enable taking a picture of a document, uploading said document picture for signature and forwarding said potentially signed document picture as a fax copy, said computer code being further operable to forward faxes to "separate mobile devices with different telephone numbers", telephone fax machines;
computer code for enabling price checking by scanning a product code in a store and comparing prices against a separate store and enabling a reservation of said product in separate other stores; and
said optical port for porting information including programs and movies to and from the mobile device wherein said optical port further enables scanning of objects including barcodes for price checks and for transferring a flash in message to a plurality of mobile devices within a location wherein a language of a flash in messages is selectable, and, wherein said flash in messages include personal messages, greeting cards, cartoon pictures, music videos, news updates or/and business cards.

15. The mobile device as recited in claim 14, wherein said storage device further comprised computer code for sending, receiving, tracking marketing related advertisement information, business leads, business alerts.

16. The mobile device as recited in claim 14, wherein said storage device further comprised computer code for postal mail tracking and/or via computer to cell phone for tracking important mail for pickup destinatons.

17. The mobile device as recited in claim 14, further comprising a solar recharging system operable to recharge a battery powering said mobile device.

* * * * *